United States Patent
Usui et al.

(10) Patent No.: US 10,652,658 B2
(45) Date of Patent: May 12, 2020

(54) SYSTEM, CONTROL METHOD, AND CONTROL TERMINAL

(71) Applicant: Yamaha Corporation, Hamamatsu-shi, Shizuoka-ken (JP)

(72) Inventors: Atsushi Usui, Hamamatsu (JP); Masaya Kano, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 15/922,413

(22) Filed: Mar. 15, 2018

(65) Prior Publication Data

US 2018/0206037 A1    Jul. 19, 2018

Related U.S. Application Data

(63) Continuation of application No. PCT/JP2016/083849, filed on Nov. 15, 2016.

(30) Foreign Application Priority Data

Dec. 4, 2015   (JP) ................................. 2015-237616

(51) Int. Cl.
*H04R 3/12* (2006.01)
*H04L 12/28* (2006.01)
(Continued)

(52) U.S. Cl.
CPC .......... *H04R 3/12* (2013.01); *H04L 12/2803* (2013.01); *H04W 8/005* (2013.01);
(Continued)

(58) Field of Classification Search
None
See application file for complete search history.

(56) References Cited

U.S. PATENT DOCUMENTS

| 9,351,077 B1* | 5/2016 | Ford ..................... H04B 1/1676 |
| 2007/0211907 A1* | 9/2007 | Eo ............................ H04R 5/04 |
| | | 381/79 |

(Continued)

FOREIGN PATENT DOCUMENTS

| EP | 1 517 464 A2 | 3/2005 |
| EP | 1 898 674 A2 | 3/2008 |

(Continued)

OTHER PUBLICATIONS

International Search Report (PCT/ISA/210) issued in PCT Application No. PCT/JP2016/083849 dated Feb. 7, 2017 with English-language translation (five (5) pages).

(Continued)

*Primary Examiner* — Qin Zhu
(74) *Attorney, Agent, or Firm* — Crowell & Moring LLP

(57) ABSTRACT

A plurality of reproduction sections are set. With regard to the reproduction section provided with the first reproduction device group that includes at least one reproduction device connected via a network with a storage that stores audio data, the audio data is transmitted via the network to each reproduction device. With regard to the reproduction section provided with the second reproduction device group includes a plurality of reproduction devices that are connected to each other using at least one audio cable and that include at least one reproduction device connected via the network with the storage, the audio data is transmitted via the network to at least one reproduction device connected via the network with the storage, and the at least one reproduction device is caused to transmit the received audio data via the at least one audio cable to at least one other reproduction device.

13 Claims, 6 Drawing Sheets

(51) Int. Cl.
  *H04W 8/00*  (2009.01)
  *H04R 5/04*  (2006.01)
  *H04R 5/02*  (2006.01)
  *H04R 27/00* (2006.01)
  *H04S 3/00*  (2006.01)
(52) U.S. Cl.
  CPC ........ *H04L 2012/2849* (2013.01); *H04R 5/02* (2013.01); *H04R 5/04* (2013.01); *H04R 27/00* (2013.01); *H04R 2205/024* (2013.01); *H04R 2227/003* (2013.01); *H04R 2227/005* (2013.01); *H04R 2420/07* (2013.01); *H04S 3/006* (2013.01)

(56) References Cited

U.S. PATENT DOCUMENTS

| | | | | |
|---|---|---|---|---|
| 2008/0063216 | A1 | 3/2008 | Sakata et al. | |
| 2008/0242222 | A1* | 10/2008 | Bryce | H04L 12/2809 455/3.06 |
| 2009/0067640 | A1* | 3/2009 | McCarty | H04R 5/02 381/77 |
| 2009/0169030 | A1* | 7/2009 | Inohara | H04R 5/04 381/80 |
| 2010/0293264 | A1* | 11/2010 | Ramsay | H04L 12/2809 709/223 |
| 2013/0022221 | A1* | 1/2013 | Kallai | H04R 3/12 381/300 |
| 2015/0378559 | A1* | 12/2015 | Reimann | G06F 3/0486 715/716 |

FOREIGN PATENT DOCUMENTS

| | | |
|---|---|---|
| GB | 2 325 124 A | 11/1998 |
| JP | 2008-92546 A | 4/2008 |

OTHER PUBLICATIONS

Japanese-language Written Opinion (PCT/ISA/237) issued in PCT Application No. PCT/JP2016/083849 dated Feb. 7, 2017 (four (4) pages).
International Preliminary Report on Patentability (PCT/IB/338 & PCT/IB/373) issued in PCT Application No. PCT/JP2016/083849 dated Jun. 14, 2018, including English translation of document C2 (Japanese-language Written Opinion (PCT/ISA/237) previously filed on Mar. 15, 2018) (eight (8) pages).
Partial Supplementary European Search Report issued in counterpart European Application No. 16870433.6 dated Jul. 3, 2019 (12 pages).
Extended European Search Report issued in counterpart European Application No. 16870433.6 dated Nov. 21, 2019 (12 pages).
English translation of Chinese Office Action issued in counterpart Chinese Application No. 201680070971.0 dated Nov. 4, 2019 (seven (7) pages).

* cited by examiner

FIG.3

| ZONE ID | ZONE NAME | DEVICE ID | AUDIO CABLE | CONNECTION DESTINATION DEVICE ID | MASTER DEVICE |
|---|---|---|---|---|---|
| 1 | KITCHEN | 1-1 | × | × | × |
| 2 | CHILDREN'S ROOM | 2-1 | × | × | × |
| 3 | LIVING ROOM | 3-1 | × | × | ○ |
| 3 | LIVING ROOM | 3-2 | ○ | 3-1 | × |
| 3 | LIVING ROOM | 3-3 | ○ | 3-2 | × |

SYSTEM, CONTROL METHOD, AND CONTROL TERMINAL

CROSS-REFERENCE TO RELATED APPLICATION

This application is a continuation of PCT International Application No. PCT/JP2016/083849, filed Nov. 15, 2016, which claims priority under 35 U.S.C. § 119 from Japanese Patent Application No. 2015-237616, filed Dec. 4, 2015, the entire disclosures of which are herein expressly incorporated by reference.

BACKGROUND OF THE INVENTION

1. Field of the Invention

The present invention relates to a system, a control method, and a control terminal.

2. Description of the Related Art

A system including a plurality of reproduction apparatuses has been conventionally known. For example, JP 2008-92546 A discloses a communication system including an adapter provided with a means of extracting data corresponding to a channel to be reproduced from data to be reproduced and controlling reproduction timing.

SUMMARY OF THE INVENTION

Incidentally, there is a system having a so-called multi-zone function by which, when the system includes a plurality of reproduction devices and there are a plurality of rooms provided with the reproduction devices, for example the same audio data can be simultaneously reproduced in the plurality of rooms. Specifically, the plurality of reproduction devices are connected via a network or an audio cable, and each of the reproduction devices receives the audio data from, for example, a storage in which the audio data is stored, via the network or the audio cable and reproduces the audio data.

In the case where the system is network-connected, a communication band of the network becomes insufficient depending on the data amount of audio data when the audio data is simultaneously transmitted to the plurality of reproduction devices, and therefore, for example the compression of audio data may be required. When the audio data is compressed, there is a risk that the quality of audio data is lowered. Moreover, when the audio data is transmitted via the network connection, a delay occurs. When a delay occurs, the reproduction devices need to include, for example, the means of controlling the reproduction timing disclosed in JP 2008-92546 A for aligning the reproduction timings between the plurality of reproduction devices. Moreover, when the system is connected via the audio cable, the audio cable needs to be wired to a distant room, and the audio cable may be lengthened.

For solving the problems described above, it is conceivable to use both network connection and audio cable connection and set whether the reproduction device is connected via the network connection or the audio cable for each reproduction device. However, the selection or combination of the connection methods is complicated, and there is a risk that the control of each device is complicated.

The present application has been proposed in view of the problems described above, and it is an object to provide a system, a control method, and a control terminal, in which the reproduction of audio data can be simply performed with high sound quality in a system including a plurality of reproduction devices.

A system according to one aspect of the invention includes at least one processor configured to: set a plurality of reproduction sections each corresponding to a reproduction unit where audio data is reproduced, each of the plurality of reproduction sections being provided with at least one of a first reproduction device group and a second reproduction device group, the first reproduction device group including at least one reproduction device that is connected via a network with a storage that stores the audio data, and the second reproduction device group including a plurality of reproduction devices that are connected to each other using at least one audio cable and that include at least one reproduction device being connected via the network with the storage; perform control for transmitting, with regard to the reproduction section provided with the first reproduction device group, the audio data via the network to each reproduction device included in the first reproduction device group; and perform control for transmitting, with regard to the reproduction section provided with the second reproduction device group, the audio data via the network to at least one reproduction device that is included in the second reproduction device group and that is connected via the network with the storage, and causing the at least one reproduction device to transmit the received audio data via the at least one audio cable to at least one other reproduction device included in the second reproduction device group.

A control method according to one aspect of the invention includes: setting a plurality of reproduction sections each corresponding to a reproduction unit where audio data is reproduced, each of the plurality of reproduction sections being provided with at least one of a first reproduction device group and a second reproduction device group, the first reproduction device group including at least one reproduction device that is connected via a network with a storage that stores the audio data, and the second reproduction device group including a plurality of reproduction devices that are connected to each other using at least one audio cable and that includes at least one reproduction device being connected via the network with the storage; performing control for transmitting, with regard to the reproduction section provided with the first reproduction device group, the audio data via the network to each reproduction device included in the first reproduction device group; and performing control for transmitting, with regard to the reproduction section provided with the second reproduction device group, the audio data via the network to at least one reproduction device that is included in the second reproduction device group and that is connected via the network with the storage, and causing the at least one reproduction device to transmit the received audio data via the at least one audio cable to at least one other reproduction device included in the second reproduction device group.

A control terminal according to one aspect of the invention includes: at least one processor configured to: select, based on information on a state of connection using at least one audio cable between a plurality of reproduction devices that can reproduce audio data, at least one of the plurality of reproduction devices as a destination to which the audio data is transmitted via a network; and perform control for transmitting the audio data via the network to the reproduction device selected as the destination.

BRIEF DESCRIPTION OF THE DRAWINGS

FIG. 3 is a diagram showing a correspondence table created in a setting process.

DETAILED DESCRIPTION OF THE INVENTION

Figure 1:
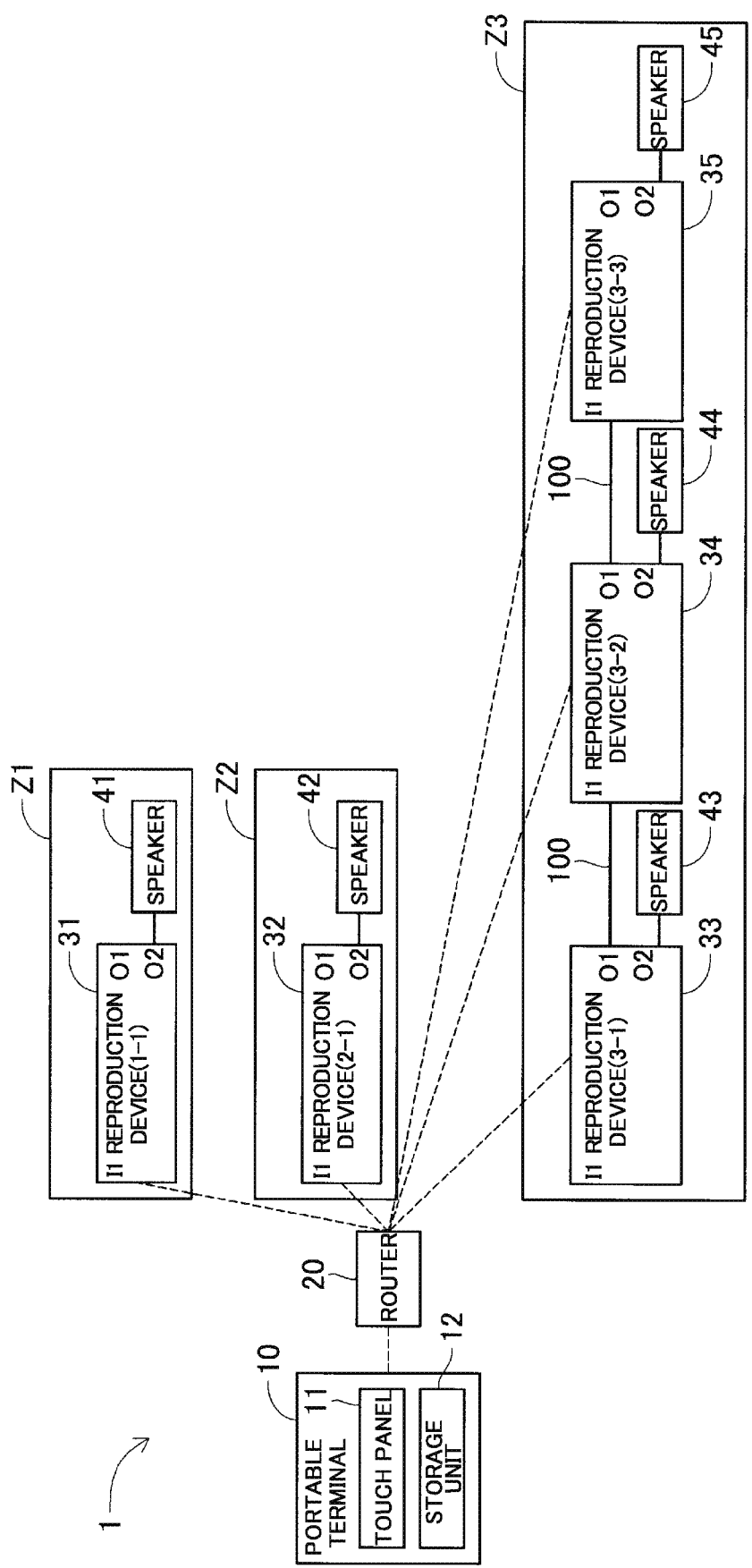
FIG. 1 is a diagram showing an overall configuration of a system according to a first embodiment.

An overall configuration of a system 1 according to a first embodiment will be described using FIG. 1. The system 1 includes a portable terminal 10, a router 20, reproduction devices 31 to 35, and speakers 41 to 45. The portable terminal 10 and the reproduction devices 31 to 35 are connected to a local area network (LAN) via the router 20. The portable terminal 10 and the reproduction devices 31 to 35 have a wireless LAN function, and can perform wireless communication with each other. The reproduction device 31 is disposed in a zone Z1; the reproduction device 32 is disposed in a zone Z2; and the reproduction devices 33 to 35 are disposed in a zone Z3. Here, the zones Z1 to Z3 are respectively, for example, a kitchen, a children's room, and a living room. Each of the reproduction devices 31 to 35 includes an input terminal I1 and output terminals O1 and O2. The speakers 41 to 45 are respectively connected to the output terminals O2 of the reproduction devices 31 to 35. Moreover, regarding the reproduction devices 33 to 35 which are disposed in the zone Z3, the output terminal O1 of the reproduction device 33 and the input terminal I1 of the reproduction device 34 are connected via an audio cable 100 that transmit analog audio data, and the output terminal O1 of the reproduction device 34 and the input terminal I1 of the reproduction device 35 are connected via an audio cable 100.

The portable terminal 10 is, for example, a mobile phone, a smartphone, a tablet terminal, or the like, which includes a touch panel 11, a storage unit 12, and the like. The touch panel 11 has the function of displaying the operating state or the like of the system 1 and the function of receiving an instruction from the user. In the portable terminal 10, an application to receive an instruction from the user and control the reproduction devices 31 to 35 via the LAN is previously installed, and the portable terminal 1 functions as a controller that controls the reproduction devices 31 to 35. Audio data is stored in the storage unit 12, and the portable terminal 10 functions as a storage. The router 20 performs a relay between the LAN and the Internet (not shown) together, and functions as a wireless LAN access point. The reproduction devices 31 to 35 have the same configuration, and have a communication function, a reproduction function, and the like. The speakers 41 to 45 emit sounds according to input audio data.

Figure 2:
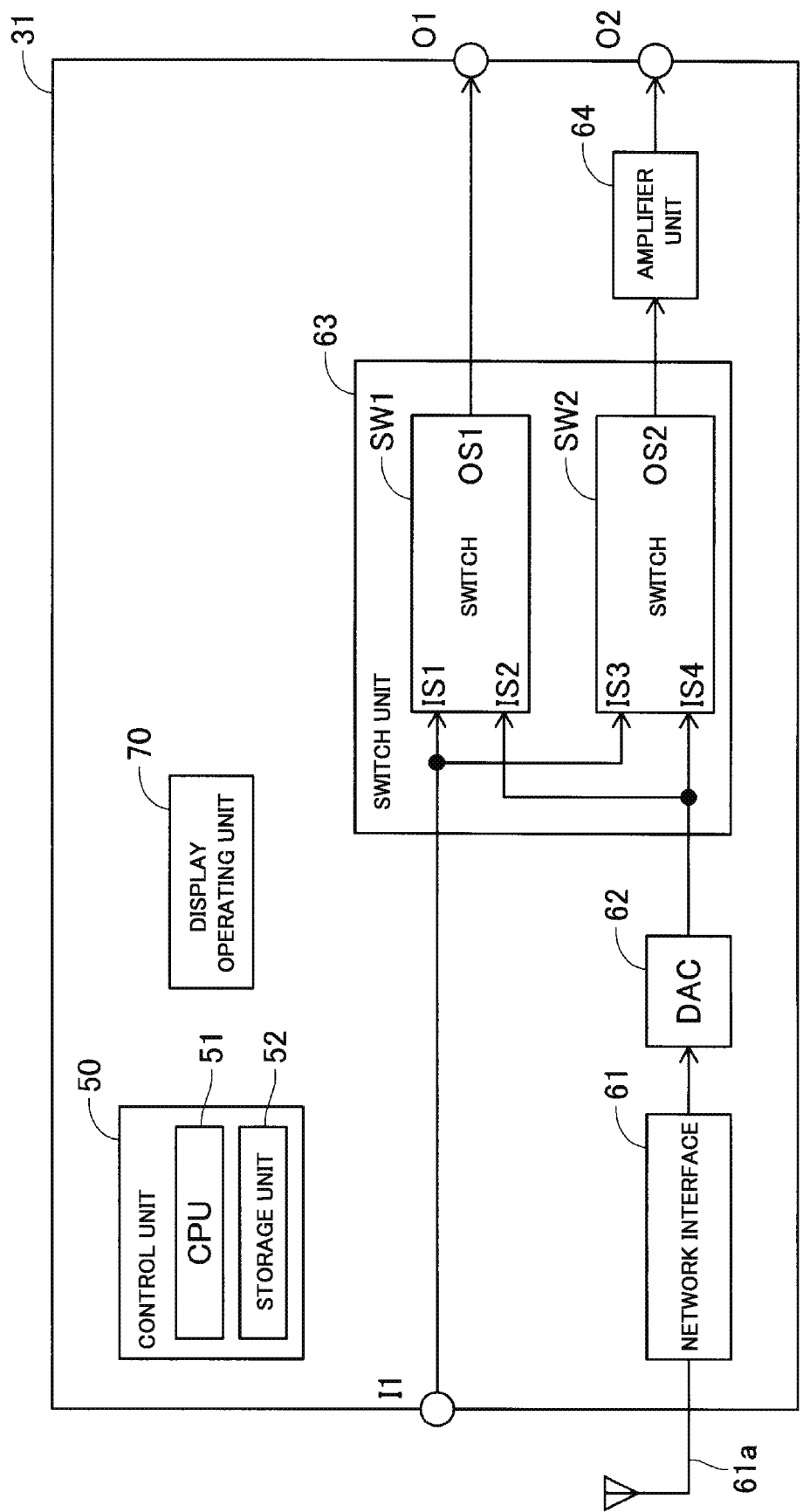
FIG. 2 is a block diagram showing an electrical configuration of a reproduction device.

Next, with regard to the configurations of the reproduction devices 31 to 35, the reproduction device 31 will be described as representative thereof using FIG. 2. The reproduction device 31 includes, in addition to the input terminal I1 and the output terminals O1 and O2, a control unit 50, a display operating unit 70, a network interface 61, a DAC 62, a switch unit 63, an amplifier unit 64, and the like. The reproduction device 31 has a pass-through function of outputting audio data that is input from the input terminal I1 or received via the network interface 61, as it is from the output terminal O1.

The input terminal I1 and the output terminal O1 are terminals to which the audio cable 100 is connected. The output terminal O2 is a terminal to which the speaker 41 is connected. The control unit 50 includes a CPU 51, a storage unit 52, and the like. The CPU 51 executes various programs stored in the storage unit 52 and thus controls the display operating unit 70, the network interface 61, the DAC 62, the switch unit 63, the amplifier unit 64, and the like, which are connected via a bus (not shown). The display operating unit 70 includes a display that displays the operating state or the like of the reproduction device 31, various buttons that receive an instruction from the user and include a communication button to be described later, and the like. The network interface 61 includes an antenna 61a, and has the functions of performing the demodulation of radio waves received via the antenna 61a and the generation of radio waves to be transmitted. According to this configuration, the reproduction device 31 can communicate with, for example, the portable terminal 10 and the reproduction devices 32 to 35 via the wireless LAN.

The DAC 62 converts digital audio data to analog audio data. The switch unit 63 includes switches SW1 and SW2. The switch SW1 includes input terminals IS1 and IS2 and an output terminal OS1. The input terminal IS1 is connected to the input terminal I1 of the reproduction device 31; the input terminal IS2 is connected to an output terminal of the DAC 62; and the output terminal OS1 is connected to the output terminal O1 of the reproduction device 31. The switch SW1 switches the connection destination of the output terminal OS1 to the input terminal IS1 or the input terminal IS2. The switch SW2 includes input terminals IS3 and IS4 and an output terminal OS2. The input terminal IS3 is connected to the input terminal I1 of the reproduction device 31; the input terminal IS4 is connected to the output terminal of the DAC 62; and the output terminal OS2 is connected to an input terminal of the amplifier unit 64. The switch SW2 switches the connection destination of the output terminal OS2 to the input terminal IS3 or the input terminal IS4. The amplifier unit 64 amplifies analog audio data according to a set volume, and outputs the analog audio data.

Next, a flow in the case of reproducing audio data in the system 1 will be described.

First, the user launches the application installed in the portable terminal 10, and performs setting relating to the system 1. For example, when the application is launched, an initial screen on which menu buttons such as "Setting", "Play", and the like are displayed is displayed on the touch panel 11. When "Setting" is selected by the user, for example menu buttons such as "Initial Setting", "Update", and the like are displayed. When "Initial Setting" is selected by the user, the portable terminal 10 starts the setting process. Here, the setting process is a process to execute, for example, the creation of a correspondence table (FIG. 3) including information such as in which zone each of the reproduction devices 31 to 35 is disposed or whether the audio cable 100 is connected to the input terminals I1 of the reproduction devices 31 to 35. The "Update" of the menu buttons is a menu button that is used to update the correspondence table when the configuration of the system 1 is changed after the setting process is executed.

Figure 4:
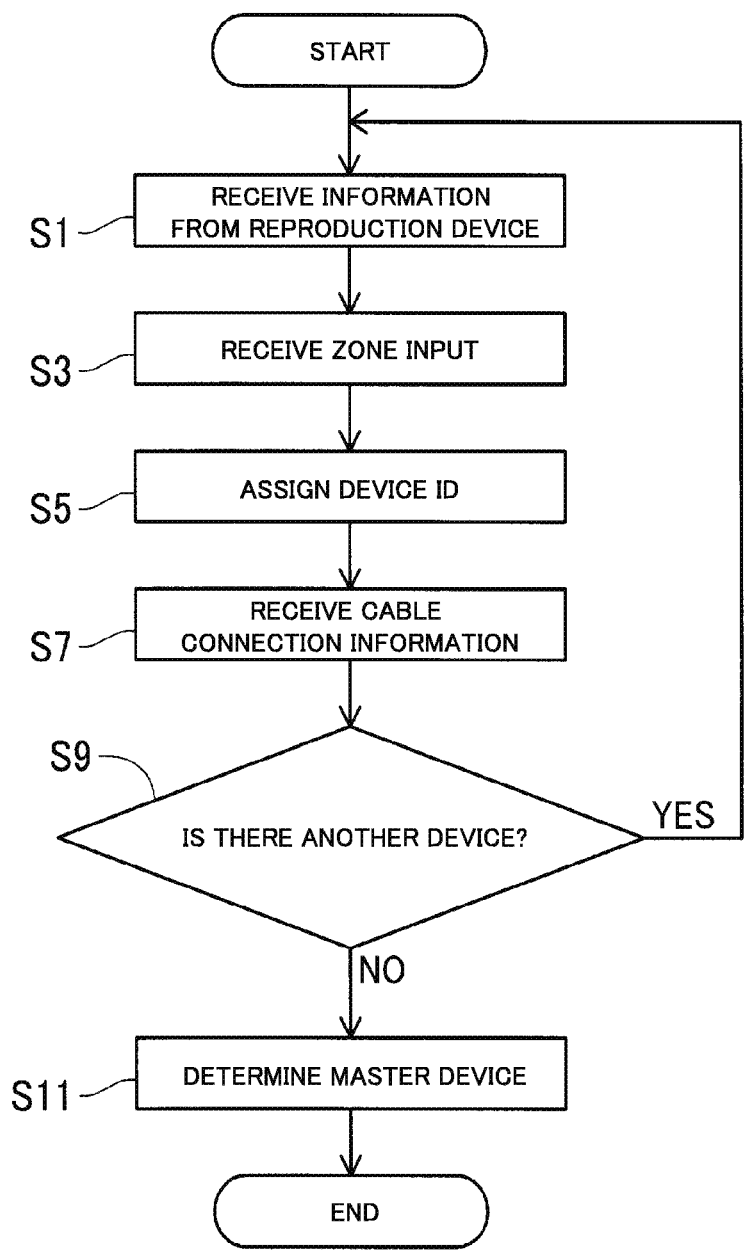
FIG. 4 is a flowchart showing processing details of the setting process.

The setting process will be described using FIG. 4. Steps S1 to S7 of the setting process are processes that are executed on each of the reproduction devices individually.

Herein, an example in which the user performs setting in order from the reproduction device 31 will be described.

First, the portable terminal 10 displays, for example, "Please press the communication button of the reproduction device" to prompt the user to depress the communication button located in the display operating unit 70 of the reproduction device 31. When the control unit 50 of the reproduction device 31 detects the depressing of the communication button, the control unit 50 of the reproduction device 31 transmits device information including, for example, an IP address by which the portable terminal 10 as a destination can identify the reproduction device 31 as a sender, via the network interface 61. When the portable terminal 10 receives the device information (S1), the portable terminal 10 determines that a zone ID of the reproduction device 31 is "1", and displays an input screen of the zone names. When the portable terminal 10 receives the inputting of the zone name "kitchen" by the user (S3), the portable terminal 10 determines that a device ID assigned to the reproduction device 31 is "1-1", and transmits the device ID to the reproduction device 31 (S5). The device ID is a number in which a zone ID and a number uniquely assigned to the reproduction device in the same zone are combined. By assigning the device ID to each of the reproduction devices 31 to 35, the portable terminal 10 can efficiently extract the reproduction device belonging to the same zone in the case of, for example, reproduction or the like. The control unit 50 of the reproduction device 31 stores the device ID "1-1" received via the network interface 61, as its own identifier in the storage unit 52. Next, the portable terminal 10 displays, for example, "Is the audio cable connected to the input terminal?" and also selection buttons of "YES" and "NO" (S7). When "NO" is selected by the user, the portable terminal 10 ends the setting of the reproduction device 31. The portable terminal 10 stores a correspondence table including information of the zone ID, the zone name, the device ID, and the presence or absence of the audio cable, which are determined for the reproduction device 31, in the storage unit 12. Next, for checking whether or not there is another reproduction device on which setting is to be performed, the portable terminal 10 displays, for example, "Is there another reproduction device?" and also the selection buttons of "YES" and "NO" (S9). When "YES" is selected by the user (S9: YES), the process returns to Step S1 for performing setting of the next reproduction device.

The portable terminal 10 executes the processes of Steps S1 to S7 for the reproduction device 32, in the same manner as on the reproduction device 31, in response to an instruction of the user. According to this configuration, information on the reproduction device 32, indicating the zone ID "2", the zone name "children's room", the device ID "2-1", and the audio cable not connected (the cross mark), is added to the correspondence table. Next, the processes of Steps S1 to S7 are executed for the reproduction device 33, and the information on the reproduction device 33, indicating the zone ID "3" of the reproduction device 33, the zone name "living room", the device ID "3-1", and the audio cable not connected (the cross mark), is added to the correspondence table.

Next, the processes of Steps S1 to S7 are executed for the reproduction device 34. Since the audio cable 100 is connected to the input terminal I1 in the reproduction device 34, the user selects "YES" to "Is the audio cable connected to the input terminal?" in Step S7. When "YES" is selected, the portable terminal 10 displays, for example, "Please select the connection destination" and also list-displays a list of the device IDs of the reproduction devices belonging to the same zone previously set. Since the reproduction device that belongs to the zone Z3 previously set is the reproduction device 33, the portable terminal 10 displays the device ID "3-1" of the reproduction device 33. When "3-1" is selected by the user, the portable terminal 10 ends the setting of the reproduction device 34. According to this configuration, information on the reproduction device 34, indicating the zone ID "3", the zone name "living room", the device ID "3-2", the audio cable 100 connected (the circle mark), the connection destination device ID "3-1" of the audio cable 100, is added to the correspondence table. Next, the portable terminal 10 executes the processes of Steps S1 to S7 for the reproduction device 35, in the same manner as on the reproduction device 34, in response to an instruction of the user. According to this configuration, information on the reproduction device 34, indicating the zone ID "3", the zone name "living room", the device ID "3-3", the audio cable 100 connected (the circle mark), and the connection destination device ID "3-2" of the audio cable 100, is added to the correspondence table. Through the processes described above, the columns of the correspondence table shown in FIG. 3, other than the column of "master device", are created. The circle marks in "audio cable" columns in FIG. 3 represent that the audio cable 100 is connected to the input terminal I1, while the cross marks represent that the audio cable 100 is not connected thereto.

Next, since the setting of all of the reproduction devices included in the system 1 ends, the user selects the "NO" button in Step S9 (S9: NO). In response to the selection of the "NO" button, the portable terminal 10 determines a master device (S11). Here, the master device is one of the plurality of reproduction devices connected to each other using the audio cables 100 and is a reproduction device that receives audio data via the wireless LAN and transmits the audio data via the audio cable 100 to a reproduction device at the rear stage connected via the audio cable 100. First, with reference to the correspondence table, the portable terminal 10 extracts the reproduction devices 33 to 35 connected using the audio cables 100. Next, all of the reproduction devices 33 to 35 are connected in series by the audio cables 100, and it is determined that the reproduction device 33 is located at the beginning of the series connection; therefore, the reproduction device 33 is determined to be the master device, and information indicating that the device ID "3-1" representing the reproduction device 33 is the master device is added to the correspondence table. Next, the portable terminal 10 stores the created correspondence table in the storage unit 12, transmits the created correspondence table to the reproduction devices 31 to 35, and ends the setting process. When the reproduction devices 31 to 35 receive the correspondence table from the portable terminal 10, the reproduction devices 31 to 35 store the correspondence table in the storage units 52. The circle mark in the "master device" column shown in FIG. 3 represents "master device", while the cross mark represents "not master device". Moreover, the correspondence table is updated every time the configuration of the system 1 is changed, for example, when a reproduction device is added, or the like.

Next, a flow in the case of reproducing audio data in the system 1 will be described.

When "Play" is selected by the user on the initial screen displayed on the touch panel 11 of the portable terminal 10, the portable terminal 10 displays a list of zones that are registered through the setting process. Here, the registered zones are zones that are included in the correspondence table. When a desired zone is selected by the user, the portable terminal 10 next displays a list of input sources. Here, the displayed input sources are previously set, and are, for example, a "portable terminal", a "server", registered other zones, and the like. The "portable terminal" is the portable terminal 10 operated by the user, and the "server" is, for example, a network attached storage (NAS), a personal computer (PC), or the like that is connected to the LAN. When, for example, the "portable terminal" is selected by the user, the portable terminal 10 displays a list of audio data that are stored in a folder associated with the application. When desired audio data is selected by the user, for example icons that receive operations such as "Play" and "Stop", a scale that receives an input for a volume adjustment, and the like are displayed on a screen. The user can listen to the audio data by selecting "Play".

Since the portable terminal 10 previously creates the correspondence table of the system 1 in the setting process, the user can listen to audio data by only selecting a desired zone and audio data without individually controlling the respective reproduction devices 31 to 35.

For example, by selecting all of the zones Z1 to Z3 as zones where the user wants to reproduce audio data, simultaneous reproduction to reproduce the same audio data in the zones Z1 to Z3 can be performed. After selecting desired audio data with the zone Z1 set as a zone where the user wants to reproduce the audio data, if the user selects desired audio data different from the audio data selected for the zone Z1, with the zone Z2 set as a zone where the user wants to next reproduce the audio data, it is possible to reproduce different audio data for each zone. Moreover, for example, by selecting the zone Z3 as a zone where the user wants to reproduce audio data and selecting the "zone Z1" which is another zone in the selection screen of the input sources, the audio data that is reproduced in the zone Z1 can be reproduced in the zone Z3.

Figure 5:
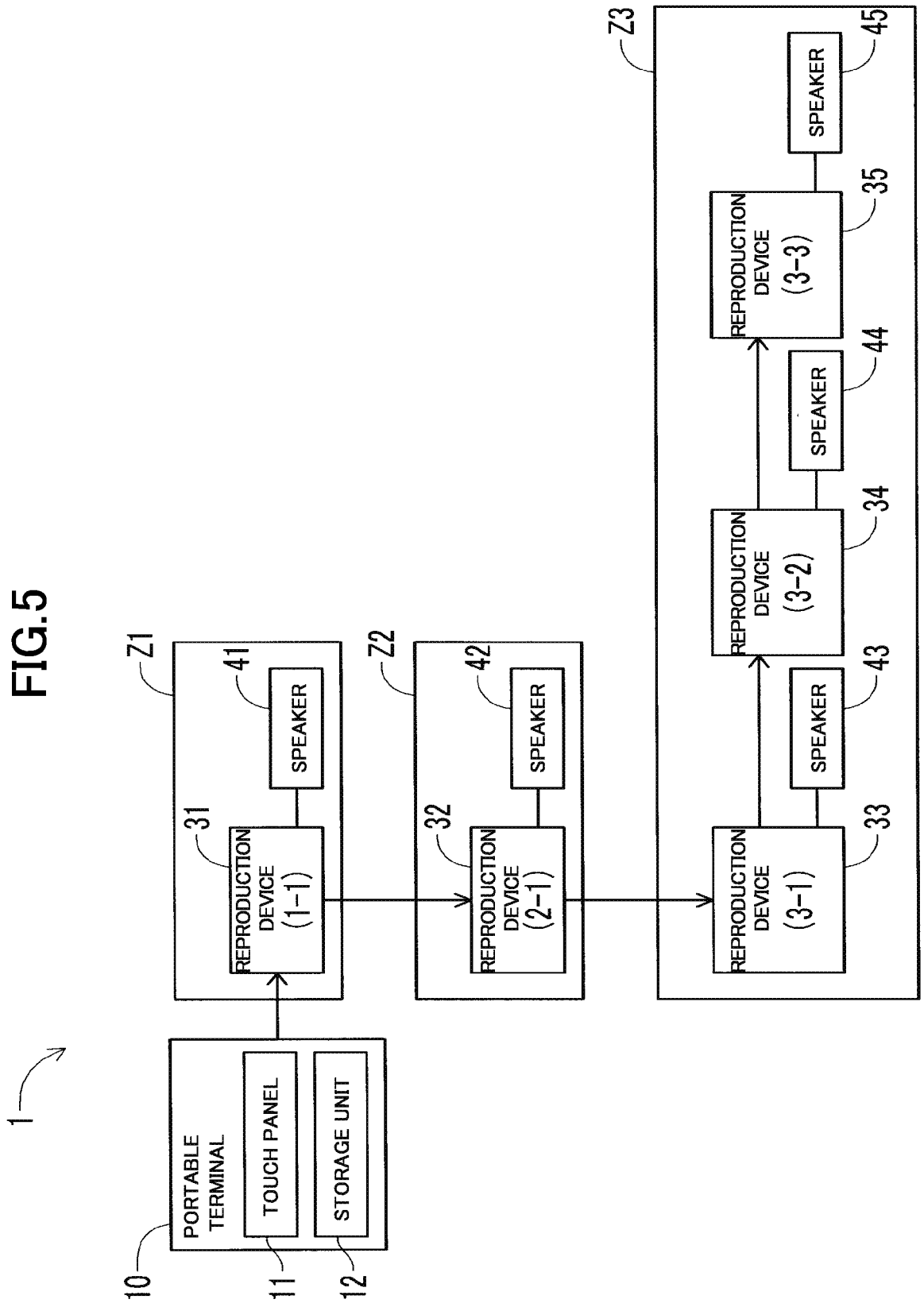
FIG. 5 is a diagram for explaining the transmission of audio data in the system.
Figure 6:
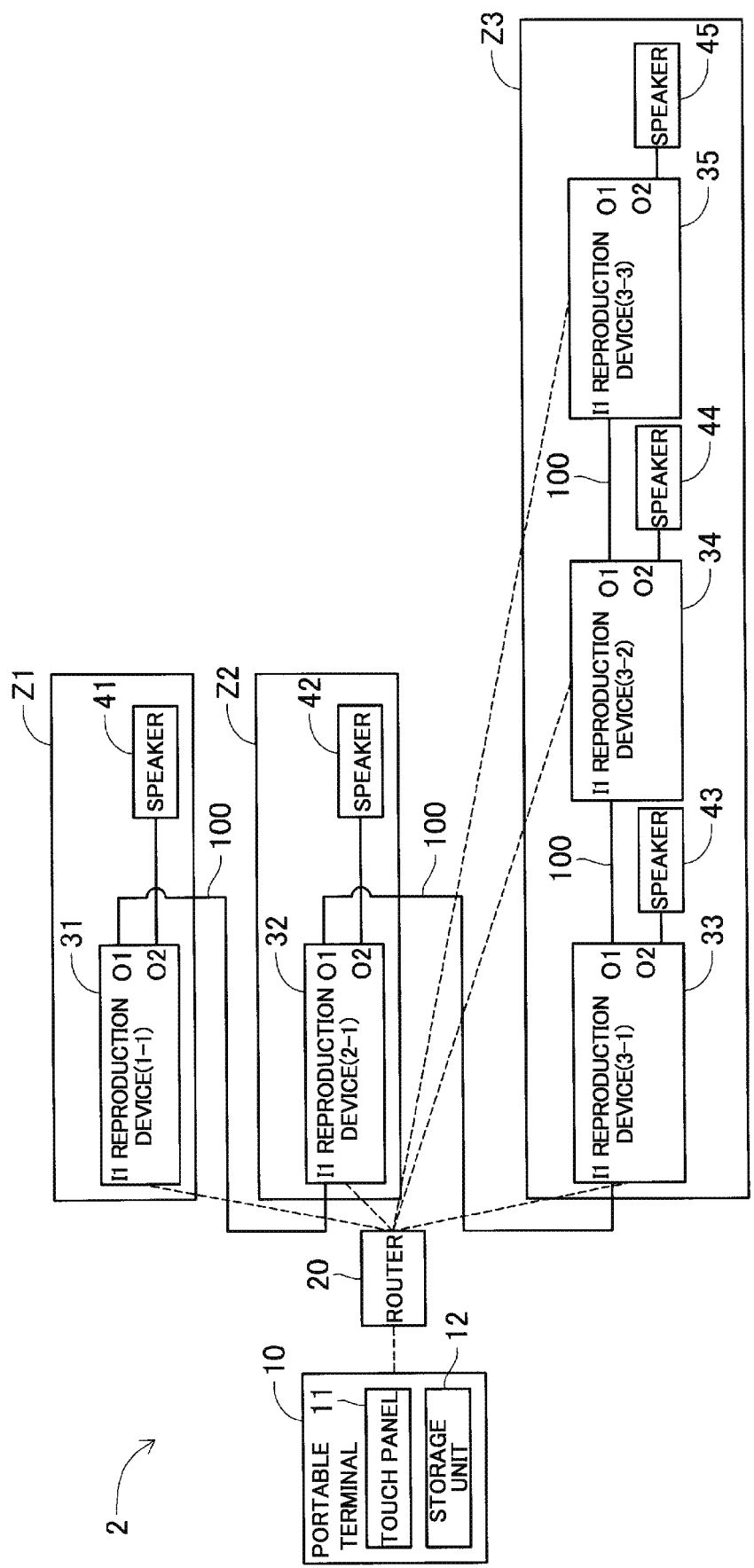
FIG. 6 is a diagram showing an overall configuration of a system according to a second embodiment.

Next, the transmission of audio data in the system 1, in the case of performing simultaneous reproduction in the zones Z1 to Z3, will be described using FIG. 5. The audio data stored in the portable terminal 10 is transmitted to the reproduction device 31 via the wireless LAN. The reproduction device 31 transmits the received audio data to the reproduction device 32 via the wireless LAN. Similarly, the reproduction device 32 transmits the received audio data to the reproduction device 33 via the wireless LAN. The reproduction device 33 transmits the received audio data to the reproduction device 34 via the audio cable 100. Similarly, the reproduction device 34 transmits the received audio data to the reproduction device 35 via the audio cable 100.

Next, control of the system 1 performed by the portable terminal 10, in the case of performing simultaneous reproduction in the zones Z1 to Z3, will be described. First, the portable terminal 10 determines the order of zones in audio data transmission. For example, the portable terminal 10 determines to transmit audio data in order of numbers of the zone IDs.

The portable terminal 10 instructs the reproduction devices 31 and 32 to respectively transfer the audio data received by the network interfaces 61, as they are, to the reproduction devices 32 and 33. Moreover, the portable terminal 10 instructs the reproduction devices 31 and 32 to connect the output terminal OS2 of the switch SW2 to the input terminal IS4. According to this configuration, the reproduction devices 31 and 32 respectively output the audio data received via the network interfaces 61 to the speakers 41 and 42. Moreover, the portable terminal 10 instructs the reproduction device 33 to connect the output terminal OS1 of the switch SW1 to the input terminal IS2, and to connect the output terminal OS2 of the switch SW2 to the input terminal IS4. According to this configuration, the reproduction device 33 outputs the audio data received via the network interface 61 to the speaker 43, and also outputs the audio data to the reproduction device 34. Moreover, the portable terminal 10 instructs the reproduction device 34 to connect the output terminal OS1 of the switch SW1 to the input terminal IS1, and to connect the output terminal OS2 of the switch SW2 to the input terminal IS3. According to this configuration, the reproduction device 34 outputs the audio data input through the input terminal I1 to the speaker 44, and also outputs the audio data to the reproduction device 35. Moreover, the portable terminal 10 instructs the reproduction device 35 to connect the output terminal OS2 of the switch SW2 to the input terminal IS3. According to this configuration, the reproduction device 35 outputs the audio data input through the input terminal I1 to the speaker 45. Through the control described above, the audio data is transmitted as shown in FIG. 5, and simultaneous reproduction is performed in the zones Z1 to Z3.

In the case of simultaneous reproduction, since also the reproduction devices 34 and 35 are connected to the wireless LAN, it is possible to transmit and receive audio data not via the audio cable 100 but via the wireless LAN. However, when the wireless LAN is heavily used, there is a risk that the communication band becomes insufficient. Moreover, when audio data is transmitted and received via the wireless LAN, there is a risk that the reproduction timing shifts because a delay occurs. Especially when the timing shifts among the reproduction devices 33 to 35 disposed in the zone Z3, the sound quality of reproduction sound is deteriorated. For solving the insufficiency of communication band, a means of compressing audio data to be transmitted to thereby reduce the total amount of audio data to be transmitted and received is also conceivable. However, when the audio data is compressed, there is the risk of causing the deterioration of the sound quality of reproduction sound. In this regard, in the reproduction devices 31 to 35, the transmission and reception of audio data are performed via the audio cable 100 between the reproduction devices 33 to 35 disposed in the same zone Z3, and thus it is possible to reduce the total amount of audio data to be transmitted and received in the entire system 1 and suppress the insufficiency of communication band. Moreover, it is possible to suppress a communication delay between the reproduction devices 33 to 35 disposed in the same zone Z3 and suppress a reduction in sound quality relating to the reproduction sound.

Moreover, in the zone Z3 where the plurality of reproduction devices are disposed, another connection method is also conceivable when the reproduction devices 33 to 35 are connected using the audio cable 100. Specifically, for example, the connection method is a method in which the reproduction device 33 and each of the reproduction devices 34 and 35 are connected with the reproduction device 33 being as a master and the reproduction devices 34 and 35 being as slaves. If the reproduction device as a master is configured to include a plurality of output terminals, audio data can be transmitted from the reproduction device as a master to the reproduction device as a slave via the audio cable. However, in the case of this method, the reproduction device serving as a master and the reproduction device serving as a slave need to be connected via the audio cable irrespective of the positions of the reproduction devices in the zone. For example, even when the reproduction device 35 is closer to the reproduction device 34 than the reproduction device 33, the reproduction device 33 as a master has to be connected to the reproduction device 35 as a slave. In this regard, since each of the reproduction devices 31 to 35 includes the output terminal O1, the reproduction devices closest to each other may be connected via the audio cable 100. Moreover, when it is desired to install more reproduction devices in the same zone, for example it is sufficient to connect a reproduction device to the closest reproduction device with the audio cable 100, change connections as necessary, and re-execute the setting process. For example, a new reproduction device may be added at the rear stage of the reproduction device 35, or a new reproduction device may be added between the reproduction device 34 and the reproduction device 35. In the case of changing the connections, the connection destination device ID of the correspondence table may be updated on the "Update" menu of the application. When the connections are changed after, for example, a new reproduction device is added to the correspondence table, the connection destination device ID may be rewritten.

When different audio data is reproduced for each zone, control for transmitting respectively selected audio data via the wireless LAN to the reproduction devices disposed in the zones selected by the user is performed. Moreover, when another zone is selected as an input source, control for transmitting audio data via the wireless LAN to the reproduction device disposed in the selected zone is performed. In any case, when the zone Z3 is selected, the reproduction device 33 receives audio data via the wireless LAN and the audio data is transmitted to the reproduction devices 34 and 35 via the audio cable 100.

Here, the zones Z1 to Z3 are examples of a reproduction section. The zones Z1 and Z2 are examples of a first reproduction device group, and the zone Z3 is an example of a second reproduction device group.

According to the first embodiment described as above, the following advantageous effects are provided.

The reproduction devices 33 to 35 in the zone Z3 are connected to each other using the audio cables 100, and the portable terminal 10 transmits audio data to the reproduction device 33 via the wireless LAN. According to this configuration, the audio data transmitted to the reproduction device 33 via the wireless LAN can be transmitted to the reproduction devices 34 and 35 via the audio cable. The number of reproduction devices to which the audio data is transmitted via the wireless LAN is made smaller than the number of reproduction devices included in the system 1, and the occurrence of communication band insufficiency of the network can be suppressed. Moreover, since the communication band of the network is secured, the audio data can be transmitted without compression and the quality of the audio data can be maintained. Since the reproduction devices 33 to 35 belonging to the zone Z3 are connected using the audio cables 100, a delay between the reproduction devices relating to the transmission of audio data can be reduced.

Prior to the transmission of audio data, the portable terminal 10 previously sets, in the setting process, which reproduction device belongs to which zone, and any one of the reproduction devices connected using the audio cables 100 as a master device to which audio data is transmitted via the wireless LAN. According to this configuration, when the user wants to reproduce audio data, the user only specifies a desired zone and audio data. After the audio data is transmitted to a master device via the wireless LAN, the audio data can be transmitted to the remaining reproduction devices via the audio cable, and thus the desired audio data can be simply reproduced in the desired zone.

Next, an overall configuration of a system 2 according to a second embodiment will be described. In the system 2, in addition to the system 1 according to the first embodiment, the reproduction device 31 and the reproduction device 32 are connected via the audio cable 100, and the reproduction device 32 and the reproduction device 33 are connected via the audio cable 100. Here, it is assumed that the zone Z1 and the zone Z2 are adjacent, that the zone Z2 and the zone Z3 are adjacent, and that the zone Z3 is closer to the zone Z2 than the zone Z1.

Also, in the system 2, a correspondence table is created by executing a setting process, and in the case of reproducing audio data in the system. 2, the portable terminal 10 controls the system 2 based on the creased correspondence table.

For example, in the case of simultaneous reproduction, the portable terminal 10 transmits audio data selected by the user to the reproduction device 31 via the wireless LAN, and instructs the reproduction devices 32 to 35 to transmit the audio data to be received to the reproduction device at the rear stage via the audio cable. Specifically, the portable terminal 10 instructs the reproduction device 31 to connect the output terminal OS1 of the switch SW1 to the input terminal IS2 and also connect the output terminal OS2 of the switch SW2 to the input terminal IS4. According to this configuration, the reproduction device 31 outputs the audio data received via the network interface 61 to the speaker 41. Moreover, the portable terminal 10 instructs the reproduction devices 32 to 34 to connect the output terminal OS1 of the switch SW1 of the switch unit 63 to the input terminal IS1 and also connect the output terminal OS2 of the switch SW2 to the input terminal IS3. According to this configuration, the reproduction devices 32 to 34 respectively output the audio data input through the input terminals I1 to the speakers 42 to 44, and also output the audio data to the reproduction devices at the rear stages. Moreover, the portable terminal 10 instructs the reproduction device 35 to connect the output terminal OS2 of the switch SW2 to the input terminal IS3, similarly to the case of simultaneous reproduction in the first embodiment. Through the control described above, simultaneous reproduction is performed in the zones Z1 to Z3.

In the system 2, compared to the system 1 according to the first embodiment, the total amount of audio data transmitted and received via the wireless LAN is further reduced in the entire system, and the insufficiency of communication band can be suppressed. Moreover, by connecting the zones closest to each other by the audio cable 100, the lengthening of the audio cable can be suppressed.

Since the reproduction devices 31 to 35 have a pass-through function, it is also possible to reproduce the same audio data in the zones Z1 and Z3 while reproducing, in the zone Z2, audio data different from that in the zones Z1 and Z3. Control in the portable terminal 10 in this case will be next described.

The portable terminal 10 instructs the reproduction device 31 to connect the output terminal OS1 of the switch SW1 to the input terminal IS2 and also connect the output terminal OS2 of the switch SW2 to the input terminal IS4. According to this configuration, the audio data received via the network interface 61 in the reproduction device 31 is input to the speaker 41. Moreover, the portable terminal 10 instructs the reproduction devices 33 to 34 to connect the output terminal OS1 of the switch SW1 to the input terminal IS1 and also connect the output terminal OS2 of the switch SW2 to the input terminal IS3. Moreover, the portable terminal 10 instructs the reproduction device 35 to connect the output terminal OS2 of the switch SW2 to the input terminal IS3, similarly to the case of simultaneous reproduction in the first embodiment. According to this configuration, the audio data input through the input terminals I1 in the reproduction devices 33 to 35 are input to the speakers 43 to 45. Moreover, the portable terminal 10 instructs the reproduction device 32 to connect the output terminal OS1 of the switch SW1 to the input terminal IS1 and also connect the output terminal OS2 of the switch SW2 to the input terminal IS4. According to this configuration, the reproduction device 32 outputs the audio data received via the network interface 61 to the speaker 43, and also outputs the audio data input through the input terminal I1 to the input terminal I1 of the reproduction device 33. Through the control described above, the reproduction of audio data different between the zones Z1 and Z3 and the zone Z2 is performed.

Here, the input terminal I1 is an example of an input port, and the path from the input terminal I1 via the switch SW1 to the output terminal O1 and the path from the output terminal of the DAC 62 via the switch SW1 to the output terminal O1 are examples of a bypass path.

According to the second embodiment described as above, the following advantageous effects are provided.

By connecting the zones Z1 to Z3 by the audio cables 100, a configuration can be employed in which, in the reproduction devices 31 to 35 connected using the audio cables 100, audio data is transmitted via the wireless LAN to the reproduction device 31, and the audio data is transmitted via the audio cable 100 to the reproduction devices 32 to 35 to which the audio data is not transmitted via the wireless LAN, irrespective of the zones. According to this configuration, the number of reproduction devices to which the audio data is transmitted via the wireless LAN is made smaller than the number of reproduction devices included in the system 1, and the occurrence of communication band insufficiency of the network can be suppressed.

In the reproduction devices 31 to 35 connected using the audio cables 100, the reproduction devices 33 to 35 are disposed in the zone Z3. Therefore, after the audio data is transmitted to the reproduction device 33, the audio data can be transmitted via the audio cable 100 also to the reproduction devices 34 and 35.

Moreover, by connecting the zone Z1, the zone Z2, and the zone Z3 adjacent to one another by the audio cables 100, the lengthening of the audio cable 100 can be suppressed, and the sound quality of audio data to be transmitted can be secured.

Since the reproduction devices 31 to 35 include the input terminal I1, the switch unit 63, and the output terminal O1, audio data is transmitted via the switch unit 63, audio data input through the input terminal I1 is output from the output terminal O1 to transfer the audio data to the reproduction device at the rear stage connected via the audio cable 100, and audio data input via the network interface 61 is also output from the output terminal O2 to emit sounds from the speaker. According to this configuration, for example the reproduction device 32 can reproduce audio data different from audio data to be transferred to the reproduction device 33. Moreover, the transmission and reception of audio data can be performed without including, separately from the reproduction device 32, the audio cable 100 for transferring audio data from, for example, the reproduction device 31 to the reproduction device 33.

Next, a modified example of the system 1 will be described. The number of portable terminals 10 having a controller function has been described as being one in the system 1. However, the number is not limited to this, and a configuration may be employed in which a plurality of portable terminals are included in the system 1. For example, the portable terminal 10 controls the reproduction device 31 included in the zone Z1, and another portable terminal controls the reproduction devices 32 to 35 included in the zones Z2 and Z3. The added portable terminal can control the system 1 by obtaining a correspondence table from, for example, any of the reproduction devices 31 to 35. Moreover, all of the reproduction devices 33 to 35 disposed in the zone Z3 have been described as being connected to the wireless LAN in the system 1. However, a configuration may be employed in which at least any one of the reproduction devices 33 to 35 is not connected to the wireless LAN. For example, in a configuration in which the reproduction device 35 is not connected to the wireless LAN, setting is previously made such that the output terminal OS1 of the switch SW1 of the reproduction device 35 is connected to the input terminal IS1 and that the output terminal OS2 of the switch SW2 is connected to the input terminal IS3. The reproduction device 35 cannot be controlled from the portable terminal 10, but, for example, the reproduction device 35 may be controlled by another controller, or the reproduction device 35 may be connected with the reproduction device 34 by a cable enabling the transmission and reception of a control signal and operate in conjunction with the reproduction device 34, for example. According to this configuration, for example, even when the reproduction device 35 is away from the router 20 as an access point and located in a range where radio waves of the wireless LAN do not reach, the reproduction device 35 can stably perform reproduction.

The invention is not limited to the embodiments, and it is needless to say that various improvements and modifications can be made within a range not departing from the spirit of the invention.

For example, the reproduction devices 31 to 35 included in the system 1 or 2 may be reproduction devices each integrated with a speaker and having a pass-through function. That is, the speakers 41 to 45 may be provided in the reproduction devices 31 to 35. Moreover, for example, the reproduction devices 31 to 35 included in the system 1 or 2 have been described as having the same configuration. However, for example the reproduction devices 31 to 35 may have different configurations from each other. For example, when the reproduction devices 33 to 35 disposed in the zone Z3 in the first embodiment are configured to have a pass-through function, audio data can be transmitted via the audio cable 100.

Moreover, the portable terminal 10 has been described as functioning as a controller in the system 1 or 2. However, the configuration is not limited to this. For example, a PC in which an application for control can be used, a remote control attached to a reproduction device, or the like may be used as a controller. Moreover, the portable terminal 10 has been described as functioning as a storage. However, the configuration is not limited to this. For example, a PC, a network attached storage (NAS), an HDD recorder, a server that is connected to the Internet (not shown) connected to the router 20 and distributes audio data may be used as a storage.

Moreover, the switch unit 63 has been described as being connected at the rear stage of the DAC 62 and at the front stage of the amplifier unit 64. However, the configuration is not limited to this. For example, the switch unit 63 may be configured to be connected at the front stage of the DAC 62. In this case, a configuration may be employed in which an audio cable that is connected to the input terminal I1 and the output terminal O1 is an audio cable that transmits digital audio data, and the transmission of digital audio data is performed between the reproduction devices connected via the audio cable. Alternatively, for example, the switch unit 63 may be configured to be connected at the rear stage of the amplifier unit 64.

Moreover, the presence or absence of connection of the audio cable has been described as being input by the user in Step S7 of the setting process. However, the configuration is not limited to this, and a configuration may be employed in which the reproduction device 31 includes a means of detecting the presence or absence of connection. For example, the reproduction device 31 may be configured such that the reproduction device 31 determines that the audio cable is connected in response to the inputting of a signal from the input terminal I1. Alternatively, a configuration may be employed in which the reproduction device 31 includes a sensor that detects whether or not the audio cable is connected to the input terminal I1.

Moreover, the reproduction device has been described as performing communication via a wireless LAN. However, the configuration is not limited to this and a wired LAN communication may also be used.

The control unit 50 has been described as being configured of the CPU 51 and the storage unit 52, but may be realized by a circuit group such as, for example, an application specific integrated circuit (ASIC).

Moreover, the zones Z1 to Z3 have been described as being, for example, a kitchen, a children's room, and a living room. However, the zone is not limited to a house and the zone can be, for example, a public address (PA) used in a facility such as a music performance venue or an event venue.

[Additional Remarks] As understood from the description of the embodiments described above, various technical ideas including the invention described below are disclosed in the specification.

A system according to one aspect of the invention includes: a plurality of reproduction devices that reproduce audio data, wherein a plurality of reproduction sections each constituting a reproduction unit where the audio data is reproduced are set, each of the plurality of reproduction sections is provided with at least any one of a first reproduction device group including at least one reproduction device that is network-connected with storage means that store the audio data, and a second reproduction device group including a plurality of reproduction devices that are connected to each other using at least one audio cable, at least one of the plurality of reproduction devices being network-connected with the storage means, with regard to the reproduction section provided with the first reproduction device group, the audio data is transmitted via the network connection to each reproduction device included in the first reproduction device group, with regard to the reproduction section provided with the second reproduction device group, the audio data is transmitted via the network connection to at least one reproduction device that is included in the second reproduction device group and is network-connected with the storage means, and in the reproduction section provided with the second reproduction device group, the audio data received by the at least one reproduction device is transmitted via an audio cable to another reproduction device.

Since the reproduction devices belonging to the second reproduction device group are connected to each other using at least one audio cable, the audio data is transmitted via the network connection to at least one of the reproduction devices connected using at least one audio cable. The audio data is transmitted via an audio cable to the reproduction device to which the audio data is not transmitted via the network connection. According to this configuration, the number of reproduction devices to which the audio data is transmitted via the network connection is reduced, and the occurrence of communication band insufficiency of the network can be suppressed. Moreover, since the communication band of the network can be secured, the audio data can be transmitted without compression and the quality of the audio data can be maintained. Since the reproduction devices belonging to the second reproduction device group are connected using at least one audio cable, a delay between the reproduction devices relating to the transmission of audio data can be reduced. According to the invention, in the system including the plurality of reproduction devices, the reproduction of audio data can be simply performed with high sound quality.

In one aspect of the invention, the reproduction device that is provided in a first reproduction section of the plurality of reproduction sections and the reproduction device that is provided in a second reproduction section of the plurality of reproduction sections may be connected via the audio cable.

By connecting the first reproduction section and the second reproduction section by the audio cable, a configuration can be employed in which, irrespective of the reproduction sections, the audio data is transmitted via the network connection to at least one of the reproduction devices connected using at least one audio cable, and the audio data is transmitted via the audio cable to the reproduction device to which the audio data is not transmitted via the network connection. According to this configuration, the number of reproduction devices to which the audio data is transmitted via the network connection is reduced, and the occurrence of communication band insufficiency of the network can be suppressed.

In one aspect of the invention, at least any one of the reproduction device in the first reproduction section and the reproduction device in the second reproduction section, which are connected via the audio cable, may be included in the second reproduction device group.

Since at least any one of the reproduction device in the first reproduction section and the reproduction device in the second reproduction section is included in the second reproduction device group, after the audio data is transmitted to at least one of reproduction devices included in the second reproduction device group, the audio data can be transmitted via the audio cable also to the remaining reproduction device included in the second reproduction device group.

In one aspect of the invention, the first reproduction section and the second reproduction section may be adjacent to each other. Alternatively, in one aspect of the invention, the audio cable may connect the reproduction devices that are adjacent to each other.

By connecting the reproduction devices adjacent to each other by the audio cable, the lengthening of the audio cable is suppressed, and the quality of the audio data to be transmitted can be secured.

In one aspect of the invention, the reproduction device may include an input port to which the audio data from the audio cable is input, a network interface that receives the audio data via the network, and a bypass path to bypass the audio data from the input port or the network interface.

Since the reproduction device includes the bypass path, the reproduction device causes the audio data from the input port or the network interface to bypass via the bypass path, and transfers the audio data to the reproduction device at the rear stage. According to this configuration, the reproduction device can reproduce audio data different from the audio data to be transferred to the reproduction device at the rear stage via the bypass path. Moreover, the system can perform the transmission and reception of audio data without including, separately from the reproduction device, an audio cable for transferring audio data to the reproduction device at the rear stage.

In one aspect of the invention, the system may further include a control terminal, and the control terminal may select, based on information on a state of connection using at least one audio cable between the plurality of reproduction devices, at least one of the plurality of reproduction devices included in the second reproduction device group as a destination to which the audio data is transmitted via the network connection.

Moreover, a control method according to one aspect of the invention is a control method that controls the above-described system, the control method including: a step of specifying a correspondence between the reproduction device and the reproduction section to which the reproduction device belongs; a step of setting any one of the reproduction devices that are connected using at least one audio cable as a master device; and a step of transmitting the audio data from the storage means to the master device via the network connection.

The control method includes, prior to the transmission of the audio data, the step of specifying which reproduction device belongs to which reproduction section, and the step of setting any one of the reproduction devices connected using at least one audio cable to a master device. Here, the master device is a reproduction device to which audio data is transmitted via the network connection, and the audio data is transmitted via an audio cable to the reproduction device other than the master device that is connected via the audio cable. According to this configuration, when the user wants to reproduce audio data, the user can simply reproduce desired audio data in a desired reproduction section only by specifying the desired reproduction section and audio data.

Moreover, a control terminal according to one aspect of the invention includes: a selection means that selects, based on information on a state of connection using at least one audio cable between a plurality of reproduction devices that can reproduce audio data, at least one of the plurality of reproduction devices as a destination to which the audio data is transmitted via a network; and a control means that performs control for transmitting the audio data via the network to the reproduction device selected as the destination.

Moreover, a control method according to one aspect of the invention includes: a selection step of selecting, based on information on a state of connection using at least one audio cable between a plurality of reproduction devices that can reproduce audio data, at least one of the plurality of reproduction devices as a destination to which the audio data is transmitted via a network; and a control step of performing control for transmitting the audio data via the network to the reproduction device selected as the destination.

Moreover, a program according to one aspect of the invention causes a computer to function as: a selection means that selects, based on information on a state of connection using at least one audio cable between a plurality of reproduction devices that can reproduce audio data, at least one of the plurality of reproduction devices as a destination to which the audio data is transmitted via a network; and a control means that performs control for transmitting the audio data via the network to the reproduction device selected as the destination. Moreover, an information storage medium according to one aspect of the invention is a computer-readable information storage medium on which the program is recorded.

In one aspect of the invention, the audio data that is received by the reproduction device selected as the destination is supplied to another reproduction device via an audio cable.

In one aspect of the invention, the plurality of reproduction devices may include a first reproduction device and a second reproduction device, and the selection means (the selection step) may select the first reproduction device as the destination when the first reproduction device is connected with the second reproduction device via an audio cable and the first reproduction device can supply the audio data received via the network to the second reproduction device via the audio cable.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A system comprising:
   at least one processor configured to:
   set a plurality of reproduction sections each corresponding to a reproduction unit where audio data is reproduced, each of the plurality of reproduction sections being provided with at least one of a first reproduction device group and a second reproduction device group, the first reproduction device group including at least one reproduction device that is connected via a network with a storage that stores the audio data, and the second reproduction device group including a plurality of reproduction devices that are connected to each other using at least one audio cable and that include a first reproduction device being connected via the network with the storage;
   perform control for transmitting, with regard to the reproduction section provided with the first reproduction device group, the audio data via the network to each reproduction device included in the first reproduction device group; and
   perform control for transmitting, with regard to the reproduction section provided with the second reproduction device group, the audio data via the network to the first reproduction device, and causing the first reproduction device to transmit the received audio data via a first audio cable of the at least one audio cable to a second reproduction device included in the second reproduction device group,
   wherein the first reproduction device includes:
     a network interface that receives the audio data via the network;
     a bypass path to supply the audio data received via the network interface to an output port; and
     the output port that supplies the audio data supplied via the bypass path to an input port of the second reproduction device via the first audio cable, and
   wherein the bypass path bypasses an amplifier unit in the first reproduction device.

2. The system according to claim 1, wherein
   a reproduction device in a first reproduction section of the plurality of reproduction sections and a reproduction device in a second reproduction section of the plurality of reproduction sections are connected via a second audio cable which is provided separately from the at least one cable.

3. The system according to claim 2, wherein
at least one of the reproduction device in the first reproduction section and the reproduction device in the second reproduction section, which are connected via the second audio cable, are included in the second reproduction device group.

4. The system according to claim 2, wherein
the first reproduction section and the second reproduction section are adjacent to each other.

5. The system according to claim 4, wherein
the reproduction devices that are adjacent to each other are connected via a third audio cable which is provided separately from the at least one cable.

6. The system according to claim 1, wherein
the at least one processor is further configured to:
select, based on information on a state of connection using the at least one audio cable between the plurality of reproduction devices included in the second reproduction device group, at least one of the plurality of reproduction devices included in the second reproduction device group as a destination to which the audio data is transmitted via the network.

7. A control method executed by a computer, the control method comprising:
setting a plurality of reproduction sections each corresponding to a reproduction unit where audio data is reproduced, each of the plurality of reproduction sections being provided with at least one of a first reproduction device group and a second reproduction device group, the first reproduction device group including at least one reproduction device that is connected via a network with a storage that stores the audio data, and the second reproduction device group including a plurality of reproduction devices that are connected to each other using at least one audio cable and that include a first reproduction device being connected via the network with the storage;
performing control for transmitting, with regard to the reproduction section provided with the first reproduction device group, the audio data via the network to each reproduction device included in the first reproduction device group; and
performing control for transmitting, with regard to the reproduction section provided with the second reproduction device group, the audio data via the network to the first reproduction device, and causing the first reproduction device to transmit the received audio data via a first audio cable of the at least one audio cable to a second reproduction device included in the second reproduction device group,
wherein the first reproduction device includes:
a network interface that receives the audio data via the network;
a bypass path to supply the audio data received via the network interface to an output port; and
the output port that supplies the audio data supplied via the bypass path to an input port of the second reproduction device via the first audio cable, and
wherein the bypass path bypasses an amplifier unit in the first reproduction device.

8. The control method according to claim 7, further comprising:
specifying a correspondence between the reproduction device and the reproduction section to which the reproduction device belongs;
setting any one of the plurality of reproduction devices included in second reproduction device group as a master device; and
transmitting the audio data from the storage to the master device via the network.

9. A control terminal comprising:
at least one processor configured to:
select, based on information on a state of connection using at least one audio cable between a plurality of reproduction devices that can reproduce audio data, at least one of the plurality of reproduction devices as a destination to which the audio data is transmitted via a network; and
perform control for transmitting the audio data via the network to the reproduction device selected as the destination,
wherein the plurality of reproduction devices include a first reproduction device and a second reproduction device,
the first reproduction device includes:
a network interface that receives the audio data via the network;
a bypass path to supply the audio data received via the network interface to an output port; and
the output port that supplies the audio data supplied via the bypass path to an input port of the second reproduction device via a first audio cable of the at least one audio cable,
the bypass path bypasses an amplifier unit in the first reproduction device, and
the at least one processor is configured to select the first reproduction device as the destination.

10. The system according to claim 1, wherein
the output port of the first reproduction device supplies, via the first audio cable, the audio data supplied via the bypass path to the input port of the second reproduction device that causes a speaker to output the audio data supplied via the first audio cable.

11. The control method according to claim 7, wherein
the output port of the first reproduction device supplies, via the first audio cable, the audio data supplied via the bypass path to the input port of the second reproduction device that causes a speaker to output the audio data supplied via the first audio cable.

12. The control terminal according to claim 9, wherein
the output port of the first reproduction device supplies, via the first audio cable, the audio data supplied via the bypass path to the input port of the second reproduction device that causes a speaker to output the audio data supplied via the first audio cable.

13. The system according to claim 1, wherein:
the bypass path further bypasses the network interface and a Digital-to-Analog Converter (DAC) in the first reproduction device.

* * * * *